…

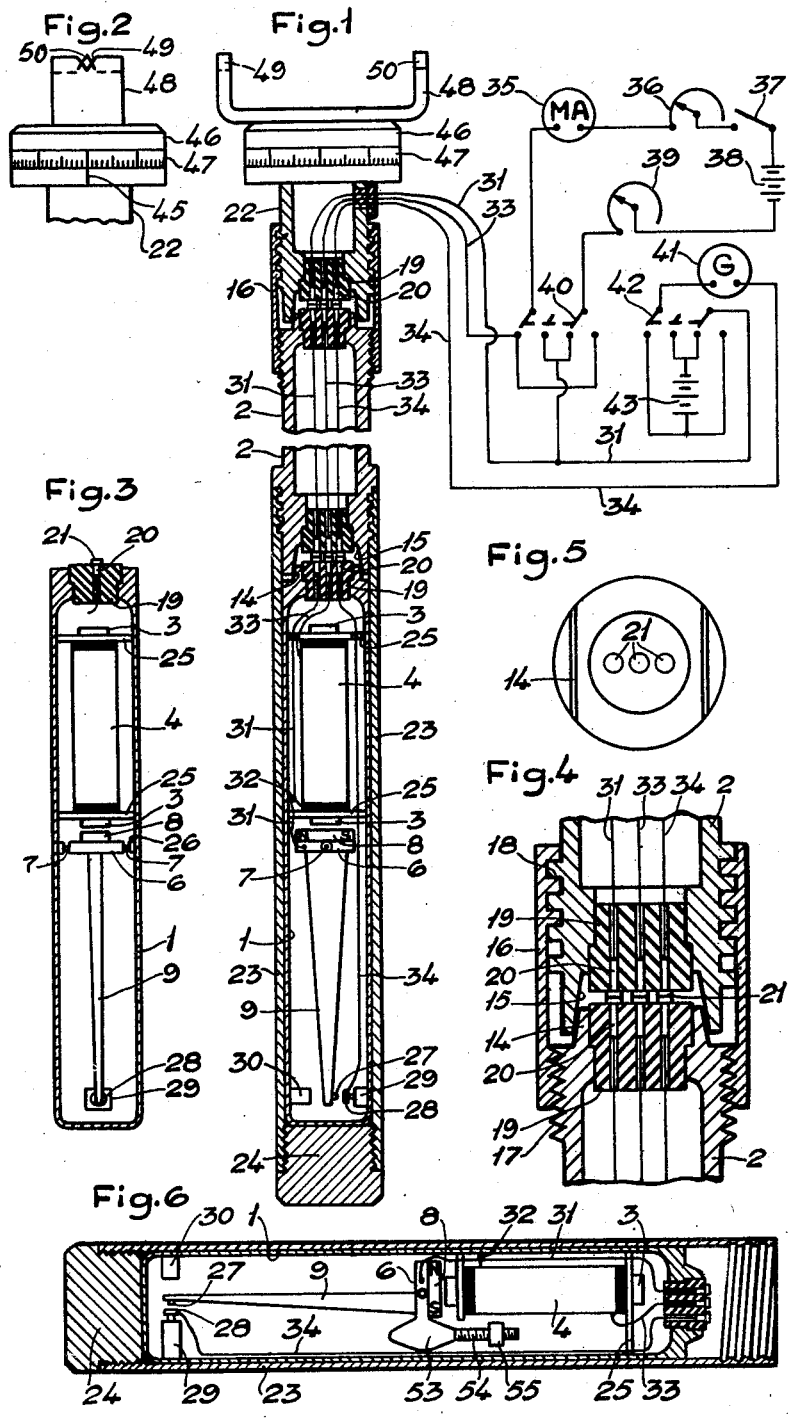

United States Patent Office 2,791,035
Patented May 7, 1957

2,791,035

DEVICE FOR DETERMINING THE INCLINATION AND DIRECTION OF DRILL HOLES IN THE GROUND

Eric Bertil Roxström, Hagersten, Stockholm, Sweden, assignor to Svenska Diamantbergborrnings Aktiebolaget, Stockholm, Sweden, a Swedish company Application October 27, 1953, Serial No. 388,504

3 Claims. (Cl. 33—205)

When making drill holes in the ground, particularly drill holes which run partly through rock and partly through looser earth-layers, it often happens that the dip or inclination of the drill hole to the horizontal plane as well as the direction of the hole will vary quite considerably at different depths of the hole. In many cases, therefore, it is very important to determine the existing deviations from the desired inclination and direction. The devices heretofore proposed for this purpose, however, are encumbered with various disadvantages, as they are either too complicated and difficult to use, or they do not give sufficiently accurate measuring results, or they cannot be used for measuring great deviations from the vertical.

It is an object of the present invention to eliminate the said difficulties and to provide a device for determining the inclination and direction of drill holes in the ground at various depths from the mouth of the hole which is simple and easy to use and which gives accurate measuring results.

The present device comprises a dip indicator which is provided with a cylindrical casing the outer diameter of which is substantially equal to the diameter of the drill hole to be examined, and which is intended to be lowered or pushed into the drill hole to that point or points thereof at which the inclination and the direction of the hole is to be determined, a contact arm which serves as a pendulum, or is connected to a pendulum, being provided in said casing. The device according to this invention is characterized by the provision in the casing of an electromagnet supported in a fixed position therein, and a second magnet, which may suitably be a permanent magnet, and which is positioned in the vicinity of the fixed electromagnet and is provided with pivots or the like journalled in said casing, the magnetic axis of said second magnet forming right angles with the axis of said pivots, which last mentioned axis forms right angles with the longitudinal axis of said casing, so that by energization of the fixed electromagnet in opposite directions the second magnet can be caused to turn in opposite directions about the axis of said pivots, the contact arm which serves as a pendulum or is attached to a pendulum being secured to said second magnet in such manner that it is capable of swinging about the axis of the pivots of said magnet towards and away from a stationary contact in said casing.

The abovementioned cylindrical casing of the dip indicator is attached to one end of a rod or shaft by the aid of which the dip indicator can be lowered or pushed into a drill hole. Said rod or shaft, which may preferably be tubular, is sufficiently flexible to be moved through curved or bent portions of the drill hole, while at the same time it is substantially non-torsional, so that it is possible by the use of said rod or shaft to turn the dip indicator about its longitudinal axis while it occupies a position at any desired point of the drill hole. Means, such as an alidade provided with an index and a scale, may be attached above the ground to the other end of the said rod or shaft to render it possible to determine the deviation of the direction of the drill hole in the ground from a predetermined direction of orientation above the ground. The coil of the fixed electromagnet is connected by electric conductors, which may suitably pass through the bore in the tubular rod or shaft, to a circuit above ground which comprises a source of current, such as a battery, means such as a variable resistor for regulating the strength of the current in said circuit, and means such as a milliammeter for measuring the strength of said current. With the aid of the device according to the invention it is possible to determine the inclination of the dip indicator when positioned in a drill hole by the aid of the simple instruments just mentioned, as it is merely necessary to measure the current required in each instance of inclination in order to move the contact arm in engagement with, or away from, the aforementioned stationary contact which, together with the said contact arm, is connected in a second circuit which includes a battery and a signal device, such as a signal lamp or a galvanometer. Possible variations in the resistance of the circuit through the electromagnet can easily be controlled and compensated by simple means, such as a rheostat, whereby the accuracy of the measurements becomes very great. The possibility of using a comparatively long contact arm also contributes to the said great accuracy. The circuit through the galvanometer need only have a low open circuit voltage, so that the risk of damages to the contacts is practically non-existent. The device according to the invention also renders it possible to determine the inclination of drill holes which extend in a substantially horizontal direction.

For a complete understanding of this invention and the advantages which it provides, reference should be had to the following description and to the accompanying drawing, which illustrates by way of example two constructional forms of the present invention. Fig. 1 shows, partly in elevation and partly in axial section, a constructional form of a device according to the invention which is mainly intended for the examination of drill holes which are more or less inclined to the vertical, and a diagram of the circuits employed. Fig. 2 shows an elevation of the alidade of the device viewed from the left in Fig. 1. Fig. 3 shows an axial section taken at 90° to that shown in Fig. 1, of the inner casing of the dip indicator and the parts enclosed therein. Fig. 4 is an axial section through a joint between the abutting ends of two links of the shaft to which the dip indicator is attached, and Fig. 5 shows a top plan view of the lower link in Fig. 4. Fig. 6 is an axial section of the dip indicator of a modified constructional form of a device according to the invention intended for examination of drill holes which extend in a substantially horizontal direction.

The dip or inclination indicator comprises a cylindrical casing 1 which is closed at its lower end, as viewed in Fig. 1, and which is preferably made of a non-magnetic metal. The dip indicator is intended to be inserted in and pushed along the drill hole to be examined, and for this purpose it is attached to one end of a rod or shaft, which may conveniently consist of a chain or string of links which are sufficiently flexible to be moved through curved or bent portions of the drill hole, and which are attached to one another in such manner that they are incapable of turning about their axes relatively to one another. In the instance illustrated in the drawing, each link of the chain or string consists of a tubular rod or link 2 which may have a length, for instance, of from three to six meters. As shown in Figs. 1 and 4, each tubular rod or link is provided at its upper end with a male coupling member in the form of a wedge-shaped projection 14 and at its lower end with a corresponding female coupling member in the form of a wedge-shaped recess 15 which serves to receive the wedge-shaped projection 14 on the adjacent link when the links 2 are assembled so that in this manner the abutting links are held against turning relatively to one another. The two abutting links are secured to one another by means of a surrounding sleeve or bushing 16 which is provided at its lower end with internal screw threads, which may be V-threads, by means of which the sleeve is screwed on to the correspondingly screw-threaded upper end 17 of the lower link 2. The sleeve 16 is provided at its upper end with internal screw threads 18, which may be square threads, and which have a larger pitch than the threads 17. Each link 2 is provided at its lower end with external screw threads corresponding to the threads 18. Therefore, by partly unscrewing the sleeve 16 from the upper end of the lower link 2 the upper portion of the sleeve is screwed onto the lower end of the upper link 2, and due to the difference of the pitches the ends of the links are pulled towards each other, so that the wedge-like projection 14 is forced into the groove 15 and the two links are rigidly interlocked. Each link 2 is provided at each end with a plug 19 of rubber or other preferably elastic insulating material. Inserted in said rubber plugs are a number of contact pins 20 provided with flat heads 21 which bear against the heads of the corresponding contacts in the plug in the adjacent link 2 when in assembled position. Attached to the contact pins 20 are electric conductors 31, 33, 34 which connect each contact pin to a corresponding contact pin at the opposite end of the link, and which will be further referred to here below.

The upper end of the uppermost link 2 of the string of links is attached, in the manner described with reference to Fig. 4, by means of a threaded sleeve 16 to the lower member 22 of an alidade which will be further described here below. The said member 22 is provided with a wedge-shaped groove 15, a plug 19 and contact pins 20 in the same manner as described in connection with Fig. 4.

The cylindrical casing 1 is provided at its upper end with a wedge-shaped projection 14 similar to the projection 14 in Fig. 4, by means of which it is inserted in the corresponding groove 15 at the lower end of the adjacent link 2. A plug 19 having contact pins 20, as above described in connection with Fig. 4, is inserted in the upper end of the casing 1. The casing 1 is surrounded by an outer tubular casing 23 which is screw-threaded onto the lower end of the adjacent link 2, thus rigidly locking the inner casing 1 to said link 2. The outer casing 23 may be provided with a bottom plug 24 screw-threaded to the wall of said casing 23 to facilitate insertion and adjustment of the inner casing 1 in the correct position relatively to the adjacent link. The outer diameter of the outer casing 23 is nearly equal to the diameter of the drill hole to be examined, so that at each position of the dip indicator in a drill hole in which it has been inserted, the longitudinal axis of the indicator will be parallel to the axis of the drill hole at that particular point.

An electromagnet 3 having a coil 4 is secured in the upper part of the casing 1 by any suitable means, such as annular disks 25. Located below the lower end of the electromagnet 3 is a plate 6 having pivots 7 by means of which it is journalled in bearings 26 secured to the wall of the casing 1 in such manner that the axis of the pivots 7, i. e. the axis of turning of the said plate 6 is perpendicular to the longitudinal axis of the casing 1. The plate 6 carries on its upper side a permanent magnet 8 the magnetic axis of which forms right angles with the axis 7—7 of turning of the plate 6. Attached to the lower side of the plate 6 is a comparatively long contact arm 9 which serves as a pendulum and which is provided at its lower end with a contact tip 27 opposite which a contact plate 28 is supported by an insulating block 29 attached to the wall of the casing 1. Attached to the wall of the casing 1 opposite the contact plate 28 is a stop 30 which serves to restrict movement of the contact arm 9 away from said contact plate.

The contact arm 9, which is made of an electrically conducting material, is connected to an electric conductor 31 which may also be electrically connected to the casing 1 at point 32, so that it serves as a ground conductor. One terminal of the coil 4 is connected to said conductor 31, and its other terminal is connected to an electric conductor 33. The contact plate 28 is connected to an electric conductor 34. The conductors 31 and 33 form part of a circuit which includes a milliammeter 35, a variable resistor or rheostat 36, a single-pole switch 37, a source of current such as a battery 38, a second rheostat 39, and a reversing switch 40. The conductors 31 and 34 form part of a circuit which includes a signal device, such as a galvanometer 41, a reversing switch 42, and a battery 43.

The lower member 22 of the alidade carries an index 45, Fig. 2. The upper member 46 of the alidade is rotatable relatively to the lower member 22 about the vertical axis of the alidade as viewed in Figs. 1 and 2, and is provided with a scale 47 which is graduated in angular degrees and cooperates with the index 45. To the upper member 46 a sight 48 is secured which is provided at one end with a sighting-notch 49 and at the other end with a bead 50.

When the dip indicator is so positioned that its axis is precisely vertical, as shown in Figs. 1, 2 and 3, and provided that no current flows through the electromagnet coil 4, the contact arm 9 is vertically suspended and the contact tip 27 at its end is at a very short distance from the contact plate 28. In this position, therefore, it will only require a current of very small magnitude through the coil 4 of the electromagnet in order to energize the electromagnet in such direction that it attracts the south pole S of the permanent magnet 8 to move the contact tip 27 in engagement with the contact plate 28. But if the dip indicator is inclined from the vertical in such direction that the contact plate 28 is moved to the right, as viewed in Fig. 1, away from the vertically suspended contact arm 9, then a stronger current through the magnet coil 4 is required in order to move the arm 9 about its pivots 7 so that the contact tip 27 engages the contact plate 28, the strength of this current being dependent upon the angle of inclination of the dip indicator from the vertical. Similarly, if the dip indicator is inclined in the opposite direction so that the contact tip 27 rests against the contact plate 28, then a current of reversed polarity is required through the coil 4 of the electromagnet in order to move the contact arm 9 away from the contact plate 28, and also in this case the strength of the current is dependent upon the angle of inclination of the dip indicator from the vertical. Therefore, before using the dip indicator for determining the dip or inclination of drill holes in the ground, it is necessary to determine the relationship of the strength of current to the angle of inclination when the axis 7—7 of turning of the contact arm 9 occupies a horizontal position. This calibration of the instrument is carried out in the following manner:

With the dip indicator above ground and placed in a vertical position, it is connected to the circuits shown in Fig. 1. By means of the rheostat 39, which may be termed a compensation rheostat, a predetermined resistance is included in the circuit of the electromagnet coil 4, for a purpose that will be described here below. The resistance of the circuit may be controlled by means of an ohmmeter in a manner well known in the art which, therefore, is deemed not to require further description. After closing the circuit from battery 38 by means of the switch 37, the variable resistor or rheostat 36 is so adjusted that the current through the circuit is gradually increased until the arm 9 swings to the right in Fig. 1 and the contact tip 27 engages the contact plate 28 and closes the circuit 34 through the galvanometer 41. If necessary, the direction of the current is reversed by means of the reversing switch 40, in which case the reversing switch 42 in the galvanometer circuit should be reversed, since the two circuits have a common ground conductor 31. The strength of the current required as indicated by the milliammeter 35 at the moment when the galvanometer circuit 34 is closed, is recorded. The dip indicator is then adjusted at an angle of, say, 10° to the vertical, and in making this adjustment as well as all further adjustments of the indicator during the calibration thereof, care is taken that the axis 7—7 of turning of the contact arm 9 occupies a horizontal position. By means of the rheostat 36 the current through the circuit of the electromagnet 3 is again gradually increased until the contact tip 27 engages the contact plate 28 and closes the circuit 34 through the galvanometer 41. The strength of the current required is read off on the milliammeter 35 and is recorded. In a similar way the dip indicator is successively adjusted in further positions of inclination at an angular distance of say 10° from one another up to an inclination of 90° from the vertical, i. e. a horizontal position, and for each such adjustment a reading of the current is taken on the milliammeter and recorded. With the use of the readings thus recorded a calibration table or calibration curve is drawn up which directly shows the relationship between the angle of inclination of the dip indicator and the strength of the current required to move the contact tip 27 in engagement with the contact plate 28. In the calibration curve the abscissa may denote the angle of inclination, and the various values of the current strength may be plotted, for instance, as positive ordinates.

Similar calibration measurements are made with the dip indicator inclined in the opposite direction so that the contact tip 27 rests on the contact plate 28. In this case the current through the electromagnet coil 4 is reversed by means of the reversing switch 40, and the reversing switch 42 is also reversed, and for each inclination of the dip indicator a reading is taken on the milliammeter 35 of the current required for moving the contact tip 27 away from the contact plate 28 to break the circuit through the galvanometer 41. The values of the current strength thus obtained may be plotted as negative ordinates in the calibration curve.

When the apparatus above described is to be used for determining the dip or inclination and the direction of a drill hole in the ground, the dip indicator 1 is assembled in the manner above described to the lower end of a string of links 2 the upper end of which is secured to the lower member 22 of the alidade. For the purpose of this description it may be assumed that when thus assembled the plane in which the contact arm 9 moves, and which is perpendicular to its axis 7—7, lies in the same axial plane as the index 45 on the lower member 22 of the alidade. Due to the interposition of various numbers of links 2 and, therefore, the varying lengths of the conductors 31 and 33 of the electromagnet circuit, the resistance of said circuit is of course varied in proportion to the length of the string of links used, and for this reason it is necessary to adjust the resistance of the circuit to that predetermined value which was used during the calibration of the instrument. Such adjustment is effected by decreasing the resistance of the compensation rheostat 39 in proportion to the amount of resistance introduced by the addition of the various numbers of links 2.

It is easily understood that when the dip indicator occupies an inclined position the strength of the current required to effect a deflection of the contact arm 9 towards or away from the contact plate 28, is dependent upon the position of the axis of the pivots 7, 7, relatively to the horizontal plane. The current required is a maximum when the said axis is horizontal, that is, when the contact arm 9 moves in a vertical plane, while the current required is a minimum when the axis of the pivots 7, 7 lies in a vertical plane. Since, as above stated, the dip indicator is calibrated in such manner that the calibration curve shows the relationship of the strength of current to the angle of inclination of the dip indicator when the axis 7—7 of turning of the contact arm 9 occupies a horizontal position, it will be understood that in order to determine the angle of inclination of the dip indicator when occupying a position in a drill hole, it is necessary to determine the maximum value of the current through the electromagnet coil 4 that is required to produce a deflection of the galvanometer 41. Theoretically, this value might be obtained by a series of trial-and-error tests made at various positions of angular displacements of the dip indicator about its axis, but this procedure is inconvenient and time-consuming, and it does not give sufficiently reliable results. A more convenient and reliable measuring procedure is as follows:

When the dip indicator has been lowered into the drill hole to the desired depth, the alidade is attached to the upper end of the top link 2, and the conductors are connected to the measuring circuits as shown in Fig. 1. By means of the sighting-notch 49 and bead 50 the sight 48 is oriented in a suitable direction, as by aiming it at a distant object, and this direction of the sight 48 and thus the position of the upper member 46 of the alidade and of the scale 47 thereon, are maintained during the subsequent observations while the dip indicator remains at the said depth. A reading is taken on the scale 47 and recorded, the electromagnet circuit is closed by means of the switch 37, and the strength of the current is gradually increased by means of the rheostat 36 until a deflection of the galvanometer 41 indicates that the contact tip 27 on the arm 9 has moved against the contact plate 28. The reading on the milliammeter 35 is recorded. If, when setting the switch 42, the galvanometer 41 makes a deflection, this indicates that the contact tip 27 is in engagement with the contact plate 28, and in this case, therefore, the current through the electromagnet is reversed by means of the reversing switch 40, and the switch 42 is also reversed, so that when energized the electromagnet 3 actuates the permanent magnet 8 in such direction as to move the arm 9 and its contact tip 27 away from the contact plate 28. The strength of the current required to this end is recorded. The current through the electromagnet circuit is then switched off, and by means of any suitable tool applied to the upper end of the string of links, the entire string including the lower member 22 of the alidade and the dip indicator is now turned through a certain angle, for instance 30°, from its first position, and a new reading is taken on the oriented scale 47 and recorded. In the manner above described the current through the electromagnet circuit is closed, and a new reading is taken on the milliammeter 35 and recorded. This procedure is repeated and readings are taken at each angular displacement of 30° of the lower alidade member 22 and the string of links, until the string of links and thus also the dip indicator have made an entire turn. From the series of readings thus obtained a curve is plotted using the angular displacements as abscissa and the milliammeter readings as ordinates. A substantially sine-shaped curve is obtained. The abscissas at the points of maximum and minimum of the said sine curve represent that angle of turning of the index 45 on the lower alidade member 22 relatively to the above-mentioned direction of orientation of the sight 48, at which the axis 7—7 of turning of the arm 9 is horizontal and the said arm moves in a vertical plane. Accordingly, the said abscissas represent the angle of deviation of the direction of the drill hole at the point to which the dip indicator is lowered, from the said direction of orientation. The amplitude of the sine curve plotted as above stated represents twice the strength of current required for moving the contact tip 27 on the arm 9 into engagement with, or away from, the contact plate 28 when the said arm 9 swings in a vertical plane, and provided that the sine curve is plotted to the same scale as the calibration curve, the amplitude measured on the sine curve can be transferred to the calibration curve from which the corresponding angle of inclination, or dip, of the dip indicator is directly obtained.

In Fig. 6 which illustrates a modified construction of a dip indicator intended for examination of drill holes which extend in a substantially horizontal direction, the same reference numerals are used as in Figs. 1 to 5 to denote similar parts. As shown in Fig. 6, there is attached to the plate 6 a weight 53 which in this case serves as a pendulum weight. The weight is provided with a screw-threaded rod 54 which carries a small weight 55 the position of which can thus be adjusted to balance the weight of the contact arm 9 which in this case does not serve as a pendulum and, therefore, can be made very light. It will be understood that the operation of the constructional form illustrated in Fig. 6 is similar to that above described in connection with Figs. 1 to 5.

I claim:

1. In a device for determining the inclination and direction of a drill hole in the ground, the combination of a dip indicator comprising a substantially cylindrical casing having an outer diameter suited to the diameter of the drill hole to be examined, an electromagnet supported in a fixed position in said casing, a second magnet positioned within said casing adjacent said electromagnet so as to be influenced thereby, pivoting means swingably journalling said second magnet in said casing so that it is capable of swinging about an axis forming right angles with the longitudinal axis of said casing, the magnetic axis of said second magnet forming right angles with said axis of said pivoting means, a contact arm attached to said second magnet and swingable therewith about the axis of said pivoting means, a stationary contact in said casing positioned in the path of swinging movement of said contact arm, an electric circuit located above ground and including a source of electric current, means for closing and breaking said circuit, a current measuring instrument, means for regulating the strength of the current in said circuit, electric conductors connecting said electromagnet of said dip indicator to said circuit, a second electric circuit located above ground and including a source of electric current, means in said second circuit for indicating when an electric current flows in said second circuit, conductors connecting said contact arm and said stationary contact of said dip indicator to said second circuit, means attached to said dip indicator for turning from above the ground said dip indicator about its longitudinal axis while in a drill hole, and means associated with said turning means above the ground for determining such turning movement of said dip indicator while in a drill hole.

2. In a device for determining the inclination and direction of a drill hole in the ground, the combination of a dip indicator comprising a substantially cylindrical casing having an outer diameter suited to the diameter of the drill hole to be examined, an electromagnet supported in a fixed position in said casing, a second magnet positioned within said casing adjacent said electromagnet so as to be influenced thereby, pivoting means swingably journalling said second magnet in said casing so that it is capable of swinging about an axis forming right angles with the longitudinal axis of said casing, the magnetic axis of said second magnet forming right angles with said axis of said pivoting means, a weighted contact arm attached to said second magnet and swingable therewith about the axis of said pivoting means, a stationary contact in said casing positioned in the path of swinging movement of said contact arm, an electric circuit located above ground and including a source of electric current, means for closing and breaking said circuit, a current measuring instrument, means for regulating the strength of the current in said circuit, electric conductors connecting said electromagnet of said dip indicator to said circuit, a second electric circuit located above ground and including a source of electric current, means in said second circuit for indicating when an electric current flows in said second circuit, conductors connecting said contact arm and said stationary contact of said dip indicator to said second circuit, means attached to said dip indicator for turning from above the ground said dip indicator about its longitudinal axis while in a drill hole, and means associated with said turning means above the ground for determining such turning movement of said dip indicator while in a drill hole.

3. In a device for determining the inclination and direction of a drill hole in the ground, the combination of a dip indicator comprising a substantially cylindrical casing having an outer diameter suited to the diameter of the drill hole to be examined, an electromagnet supported in a fixed position in said casing, a second magnet positioned within said casing adjacent said electromagnet so as to be influenced thereby, pivoting means swingably journalling said second magnet in said casing so that it is capable of swinging about an axis forming right angles with the longitudinal axis of said casing, the magnetic axis of said second magnet forming right angles with said axis of said pivoting means, a contact arm attached to said second magnet and swingable therewith about the axis of said pivoting means, a stationary contact in said casing positioned in the path of swinging movement of said contact arm, an electric circuit located above ground and including a source of electric current, means for closing and breaking said circuit, a current measuring instrument, means for regulating the strength of the current in said circuit, electric conductors connecting said electromagnet of said dip indicator to said circuit, a second electric circuit located above ground and including a source of electric current, means in said second circuit for indicating when an electric current flows in said second circuit, conductors connecting said contact arm and said stationary contact of said dip indicator to said second circuit, a laterally flexible shaft non-rotatably attached to said dip indicator and adapted from above the ground to transmit turning movement to said dip indicator about its longitudinal axis while in a drill hole, said shaft comprising a plurality of tubular links, means for rigidly connecting abutting ends of said links non-rotatably to one another, a number of lengths of electric conductors within each such tubular link, contact pins attached to the ends of said lengths of electric conductors at each end of each such link and electrically insulated therefrom, an alidade comprising two members rotatable relatively to one another about a common axis, one member of said alidade being non-rotatably attached to one end of said shaft above the ground and carrying an index, the second member of said alidade having a scale graduated in angular degrees cooperating with said index on said first member, and a sight attached to said second member of said alidade.

References Cited in the file of this patent

UNITED STATES PATENTS

| | | |
|---|---|---|
| 1,209,102 | Anschutz-Kaempfe | Dec. 19, 1916 |
| 1,928,970 | Johnston | Oct. 3, 1933 |